United States Patent
Davidson et al.

(10) Patent No.: US 10,689,835 B2
(45) Date of Patent: Jun. 23, 2020

(54) SPRING ADJUSTABLE HANDLE FOR FAUCET VALVE ASSEMBLY

(71) Applicant: Delta Faucet Company, Indianapolis, IN (US)

(72) Inventors: Kyle R. Davidson, Noblesville, IN (US); Curtis H. Harris, Noblesville, IN (US); Gerald R. Hayes, Lebanon, IN (US); Darrell S. Crowe, Lebanon, IN (US)

(73) Assignee: Delta Faucet Company, Indianapolis, IN (US)

(*) Notice: Subject to any disclaimer, the term of this patent is extended or adjusted under 35 U.S.C. 154(b) by 0 days.

(21) Appl. No.: 16/277,447

(22) Filed: Feb. 15, 2019

(65) Prior Publication Data

US 2019/0271140 A1    Sep. 5, 2019

Related U.S. Application Data

(60) Provisional application No. 62/637,366, filed on Mar. 1, 2018.

(51) Int. Cl.
| | |
|---|---|
| *F16K 31/60* | (2006.01) |
| *E03C 1/04* | (2006.01) |
| *F16D 1/12* | (2006.01) |
| *F16D 1/108* | (2006.01) |
| *F16D 1/10* | (2006.01) |

(52) U.S. Cl.
CPC ............ *E03C 1/0412* (2013.01); *F16D 1/108* (2013.01); *F16D 1/12* (2013.01); *F16K 31/60* (2013.01); *F16K 31/605* (2013.01); *F16D 2001/103* (2013.01)

(58) Field of Classification Search
CPC ........ F16K 27/02; F16K 31/60; F16K 31/605; E03C 1/0412
See application file for complete search history.

(56) References Cited

U.S. PATENT DOCUMENTS

| | | | |
|---|---|---|---|
| 1,654,550 A | 2/1927 | Muend | |
| 2,064,623 A * | 12/1936 | Mueller | ............... F16K 35/027 251/96 |
| 4,186,761 A | 2/1980 | Guarnieri | |
| 4,515,037 A | 5/1985 | Block | |
| 4,593,430 A | 6/1986 | Spangler et al. | |
| 4,961,443 A | 10/1990 | Buccicone et al. | |
| 5,082,023 A | 1/1992 | D'Alayer de Costemore d'Arc | |
| 5,257,645 A | 11/1993 | Scully et al. | |
| 2,355,736 A | 8/1994 | Klein | |
| 5,551,124 A | 9/1996 | Zeringue | |

(Continued)

FOREIGN PATENT DOCUMENTS

| | | |
|---|---|---|
| CN | 201661742 | 12/2010 |
| CN | 201944369 | 8/2011 |
| CN | 206770667 | 12/2017 |

*Primary Examiner* — Kevin L Lee
(74) *Attorney, Agent, or Firm* — Faegre Drinker Biddle & Reath LLP (57) ABSTRACT

A valve assembly of a faucet includes a valve body, a valve cartridge received within the valve body and including a valve stem defining a longitudinal axis, and a handle operably coupled to the valve stem of the valve cartridge. Illustratively, a spring biases splines of a valve stem adapter downwardly into engagement with splines of the valve stem.

20 Claims, 7 Drawing Sheets

(56) References Cited

U.S. PATENT DOCUMENTS

| | | | |
|---|---|---|---|
| 5,671,904 A * | 9/1997 | Minutillo | F16K 35/027 16/441 |
| 5,947,149 A | 9/1999 | Mark | |
| 6,170,799 B1 * | 1/2001 | Nelson | F16K 35/027 251/96 |
| 6,279,604 B1 | 8/2001 | Korb et al. | |
| 6,438,771 B1 | 8/2002 | Donath, Jr. et al. | |
| 8,567,430 B2 | 10/2013 | Allen et al. | |
| 8,881,755 B2 | 11/2014 | Thomas et al. | |
| 9,062,796 B2 | 6/2015 | Horsman et al. | |
| 9,481,985 B1 | 11/2016 | Chen et al. | |
| 10,436,343 B2 * | 10/2019 | Crowe et al. | F16K 31/605 |
| 2015/0152975 A1 | 6/2015 | Jonte | |
| 2016/0326730 A1 | 11/2016 | Chen et al. | |
| 2019/0178403 A1 | 6/2019 | Crowe | |

* cited by examiner

SPRING ADJUSTABLE HANDLE FOR FAUCET VALVE ASSEMBLY

CROSS-REFERENCE TO RELATED APPLICATION

The present application claims priority to U.S. Provisional Patent Application Ser. No. 62/637,366, filed Mar. 1, 2018, the disclosure of which is expressly incorporated herein by reference.

BACKGROUND AND SUMMARY OF THE DISCLOSURE

The present invention relates to a valve assembly and, more particularly, to a valve assembly including a faucet handle assembly that provides for rotational alignment of a handle relative to a valve stem.

According to an illustrative embodiment of the present disclosure, a valve assembly provides for a screw down widespread handle assembly to be rotationally aligned by lifting up on a handle. Illustratively, a hub threadably engages a mounting base or valve body secured to a mounting deck. The handle can then be lifted against the force of a spring, thereby uncoupling splines that are configured to transmit rotational force to a valve stem. The handle can then be rotated independent of the valve stem, placed in a user preferred rotational angle and released to reengage the splines.

According to an illustrative embodiment of the present disclosure, a valve assembly for a faucet includes a valve body, and a valve cartridge received within the valve body and including a valve stem defining a longitudinal axis and having a plurality of first splines. A hub includes an internal chamber extending between a lower end and an upper end, the lower end being coupled to the valve body. A stem adapter extends along the longitudinal axis between a lower end and an upper end, the lower end having a plurality of second splines. A handle is operably coupled to the upper end of the stem adapter. A spring extends between the hub and the stem adapter, the spring biasing the plurality of second splines into engagement with the plurality of first splines.

According to another illustrative embodiment of the present disclosure, a handle assembly for operating a valve cartridge received within a valve body of a faucet includes a hub, a stem adapter extending between a lower end and an upper end, the lower end of the stem adapter including a plurality of internal splines, and a handle operably coupled to the upper end of the stem adapter. A spring extends between a downwardly facing surface of the hub and an upwardly facing surface of the stem adapter. The spring biases the plurality of internal splines into engagement with a plurality of external splines of the valve cartridge. A lower retaining cup receives a lower end of the spring and is supported by the upwardly facing surface of the stem adapter. An upper retaining cup receives an upper end of the spring and is supported by the downwardly facing surface of the hub.

According to a further illustrative embodiment of the present disclosure, a valve assembly for a faucet includes a valve body, and a valve cartridge received within the valve body and including a valve stem defining a longitudinal axis and having a plurality of first splines. A hub includes an internal chamber extending between a lower end and an upper end, the lower end being coupled to the valve body. A stem adapter extends along the longitudinal axis between a lower end and an upper end, the lower end of the stem adapter having a plurality of second splines. A handle is operably coupled to the upper end of the stem adapter. A spring extends between an upwardly facing surface on the stem adapter and a downwardly facing surface of the hub. The spring biases the plurality of second splines into engagement with the plurality of first splines. The stem adapter includes a flange defining the upwardly facing surface, and the spring concentrically receives the stem adapter.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

A detailed description of the drawings particularly refers to the accompanying figures, in which.

DETAILED DESCRIPTION OF THE DRAWINGS

The embodiments of the invention described herein are not intended to be exhaustive or to limit the invention to the precise form disclosed. Rather, the embodiments selected for description have been chosen to enable one skilled in the art to practice the invention.

Figure 1:
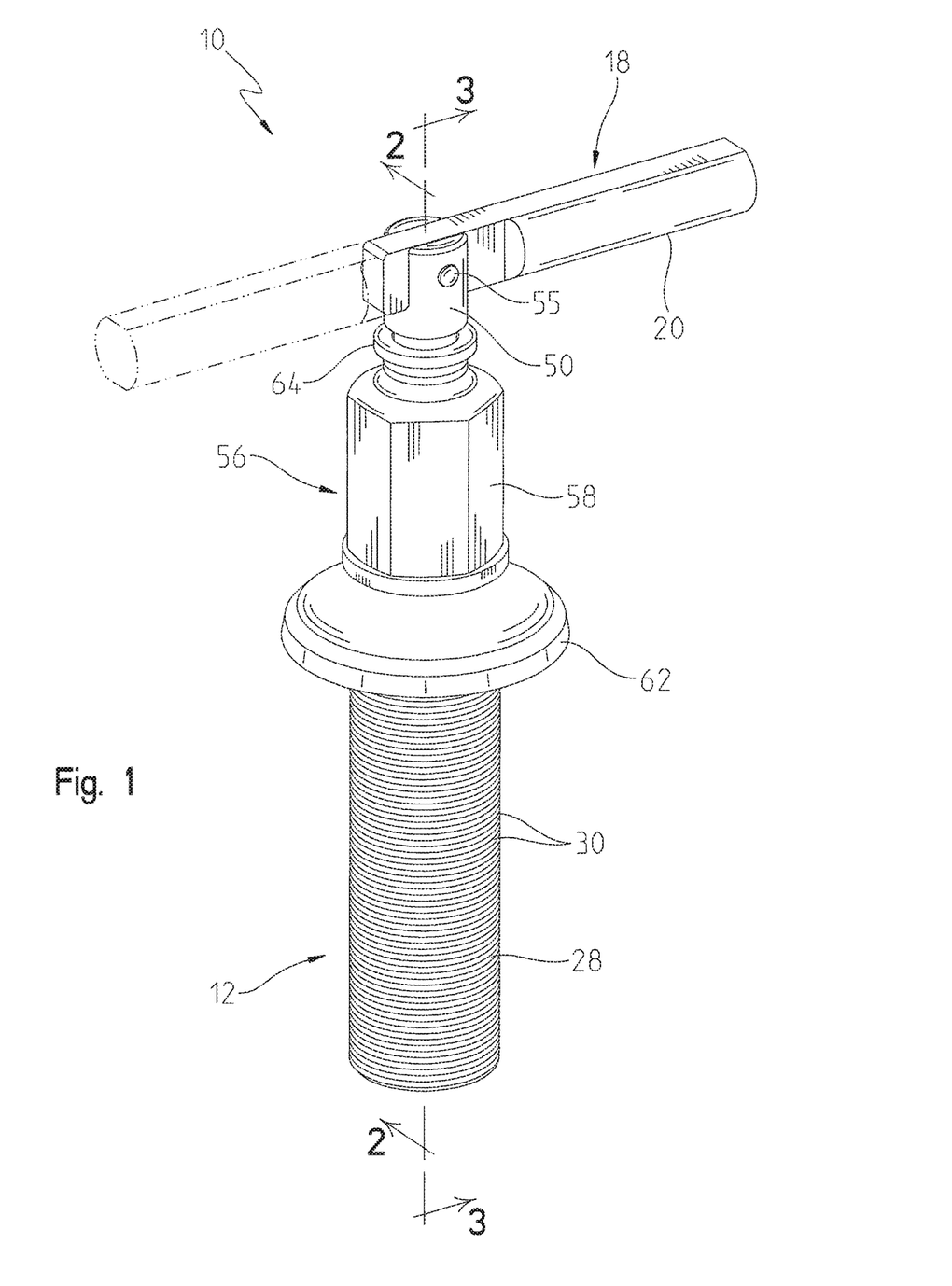
FIG. 1 is a perspective view of an illustrative valve assembly of the present disclosure, showing an alternative rotational position of the handle in phantom.
Figure 2:
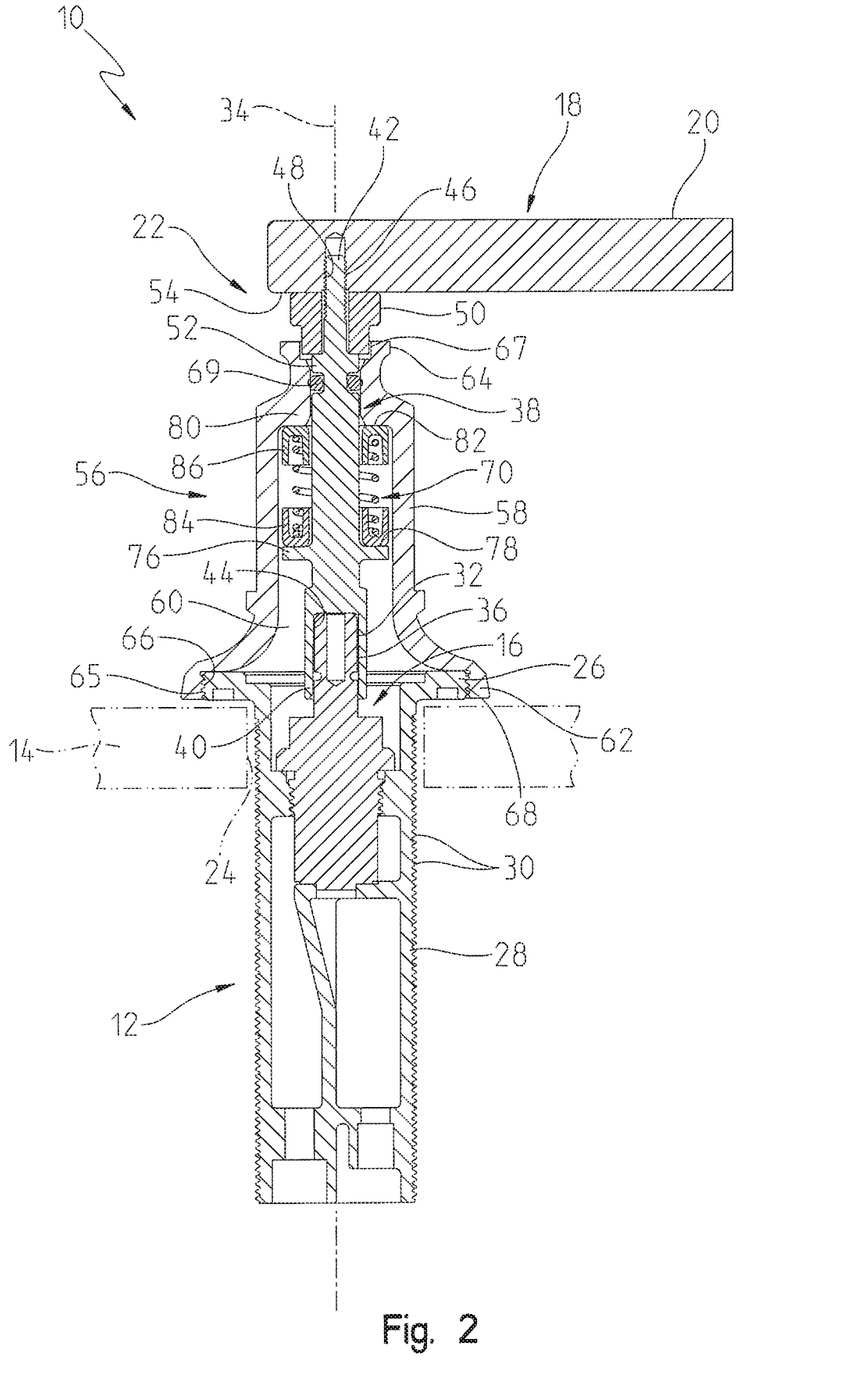
FIG. 2 is a cross-sectional view of the illustrative valve assembly taken along line 2-2 of FIG. 1.
Figure 3:
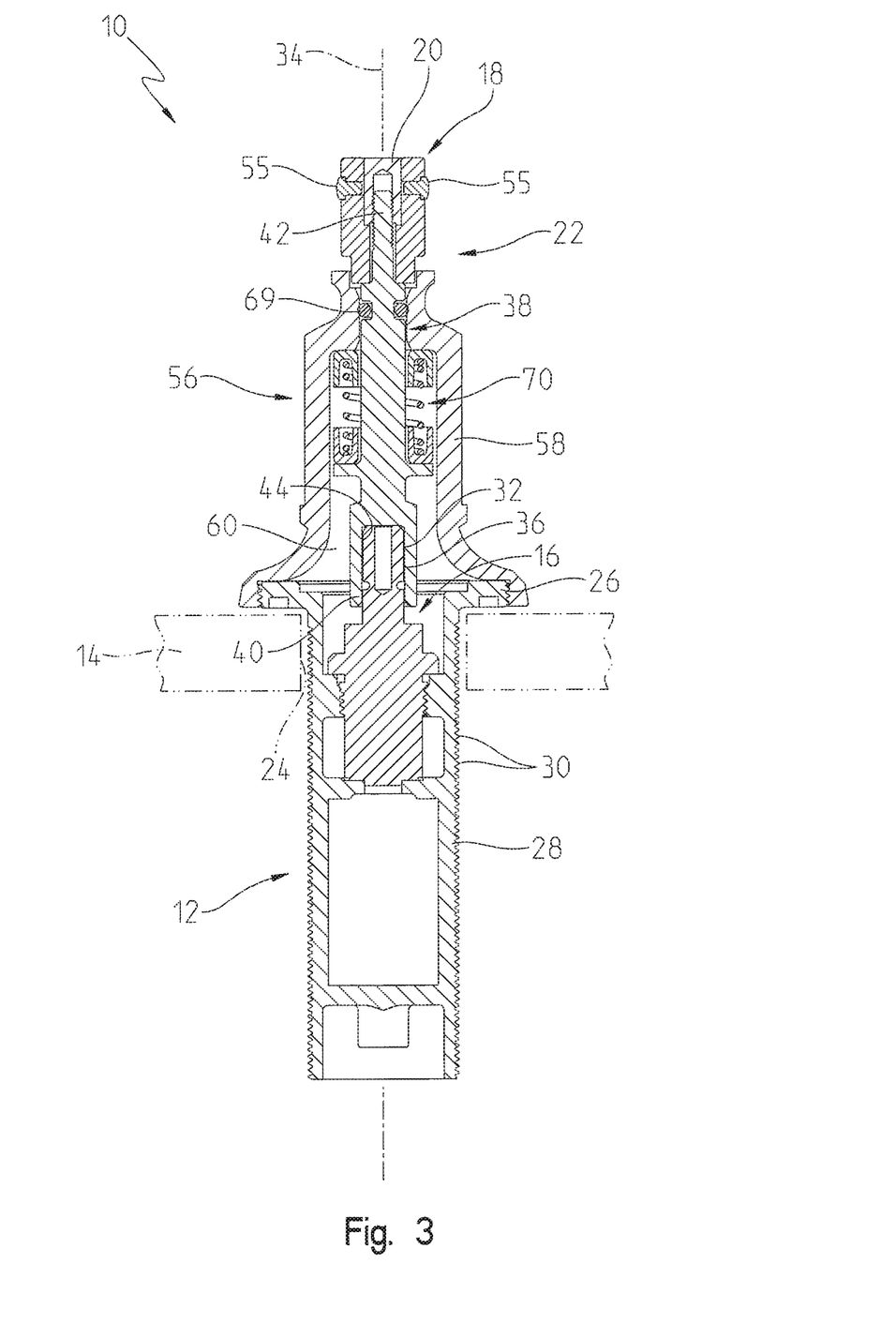
FIG. 3 is a cross-sectional view of the illustrative valve assembly taken along line 3-3 of FIG. 1.
Figure 4:
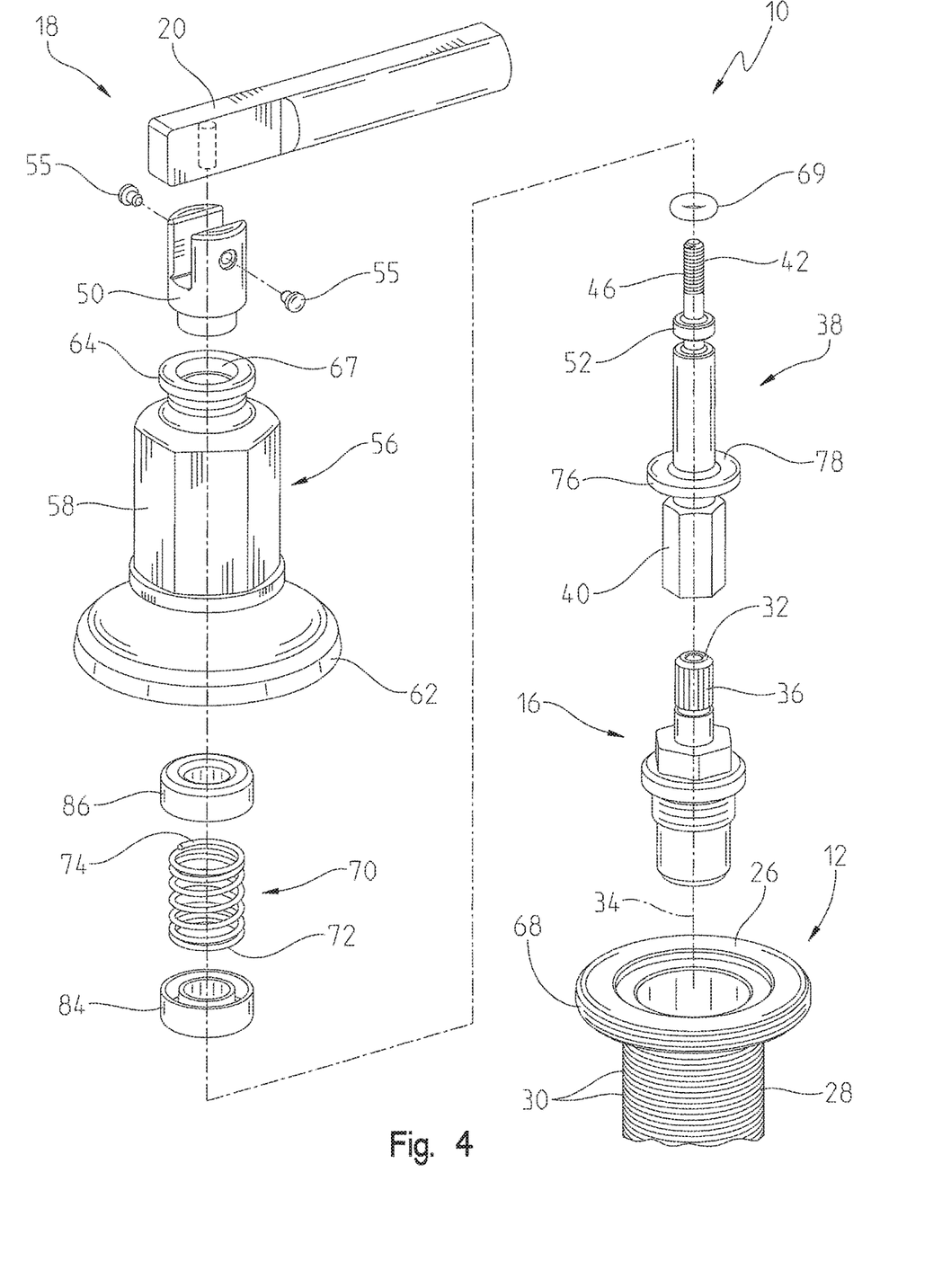
FIG. 4 is an exploded perspective view of the valve assembly of FIG. 1.

Referring initially to FIGS. 1-3, an illustrative valve assembly 10 of the type used with a widespread faucet is shown as including a mounting base or valve body 12 configured to be mounted to a sink deck 14. A valve cartridge 16 is received within the valve body 12 such that it extends below the sink deck 14 (i.e., a "sunken" valve). A handle assembly 18 is operably coupled to the valve cartridge 16 and includes a rotatable handle 20. A retainer subassembly 22 is illustratively configured to couple the handle 20 to the valve cartridge 16.

With reference to FIG. 2, the valve body 12 is configured to be supported within an opening 24 in the sink deck 14 and illustratively includes an upper flange 26 and a downwardly extending tubular mounting shank 28. The mounting shank 28 includes a plurality of external threads 30 configured to cooperate with a mounting nut (not shown) for securing the valve body 12 to the sink deck 14.

The valve cartridge 16 illustratively includes a cartridge or valve stem 32 defining a longitudinal axis 34. The valve stem 32 includes a plurality of first splines 36, illustratively external splines extending parallel to the longitudinal axis 34. The valve stem 32 is operably coupled to internal flow control members (not shown), such as a rotatable fluid flow plate or disc fluidly coupled to a fixed fluid flow plate or disc. The valve cartridge 16 may be similar to that detailed in U.S. Pat. No. 8,881,755 to Thomas et al., the disclosure of which is expressly incorporated herein by reference.

A stem adapter 38 extends upwardly from the valve cartridge 16 from a lower end 40 to an upper end 42. The lower end 40 of the stem adapter 38 includes a plurality of second splines 44, illustratively internal splines extending parallel to the longitudinal axis 34. The handle 20 is operably coupled to the upper end 42 of the stem adapter 38. Illustratively, the upper end 42 of the stem adapter 38 includes external threads 46 operably coupled to internal threads 48 formed within the handle 20. A spacer 50 is illustratively supported by the stem adapter 38 and positioned intermediate a shoulder 52 of the stem adapter 38 and a lower surface 54 of the handle 20. Decorative pins or buttons 55 are illustratively coupled to the spacer 50.

A hub 56 illustratively includes a body 58 defining an internal chamber 60 extending between a lower end 62 and an upper end 64. The stem adapter 38 extends within the internal chamber 60, wherein the lower end 40 of the stem adapter 38 extends through a lower opening 65 of the hub 56. The upper end of the stem adapter 38 extends through an upper opening 67 of the hub 56. A retainer, illustratively an o-ring 69, is received within the upper opening 67 intermediate the stem adapter 38 and the hub 56 to assist in maintaining an axial position of the stem adapter 38 relative to the hub 56, and to reduce radial play or wobble in the stem adapter 38. The lower end 62 of the body 58 illustratively includes internal threads 66 configured to operably couple with external threads 68 supported by the flange 26 of the valve body 12.

A spring 70 illustratively extends between the hub 56 and the stem adapter 38. The spring 70 is configured to downwardly bias the stem adapter 38 along the longitudinal axis 34 toward the valve stem 32, and thereby bias the plurality of second splines 44 of the stem adapter 38 into engagement with the plurality of first splines 36 of the valve stem 32. More particularly, the spring 70 is illustratively a compression spring extending between a lower end 72 and an upper end 74, and concentrically receiving the stem adapter 38. The spring 70 extends between a flange 76 on the stem adapter 38 defining an upwardly facing surface 78, and an upper wall 80 of the hub 56 defining a downwardly facing surface 82. Illustratively, a lower retaining cup 84 receives the lower end 72 of the spring 70, while an upper retaining cup 86 receives the upper end 74 of the spring 70.

Figure 5:
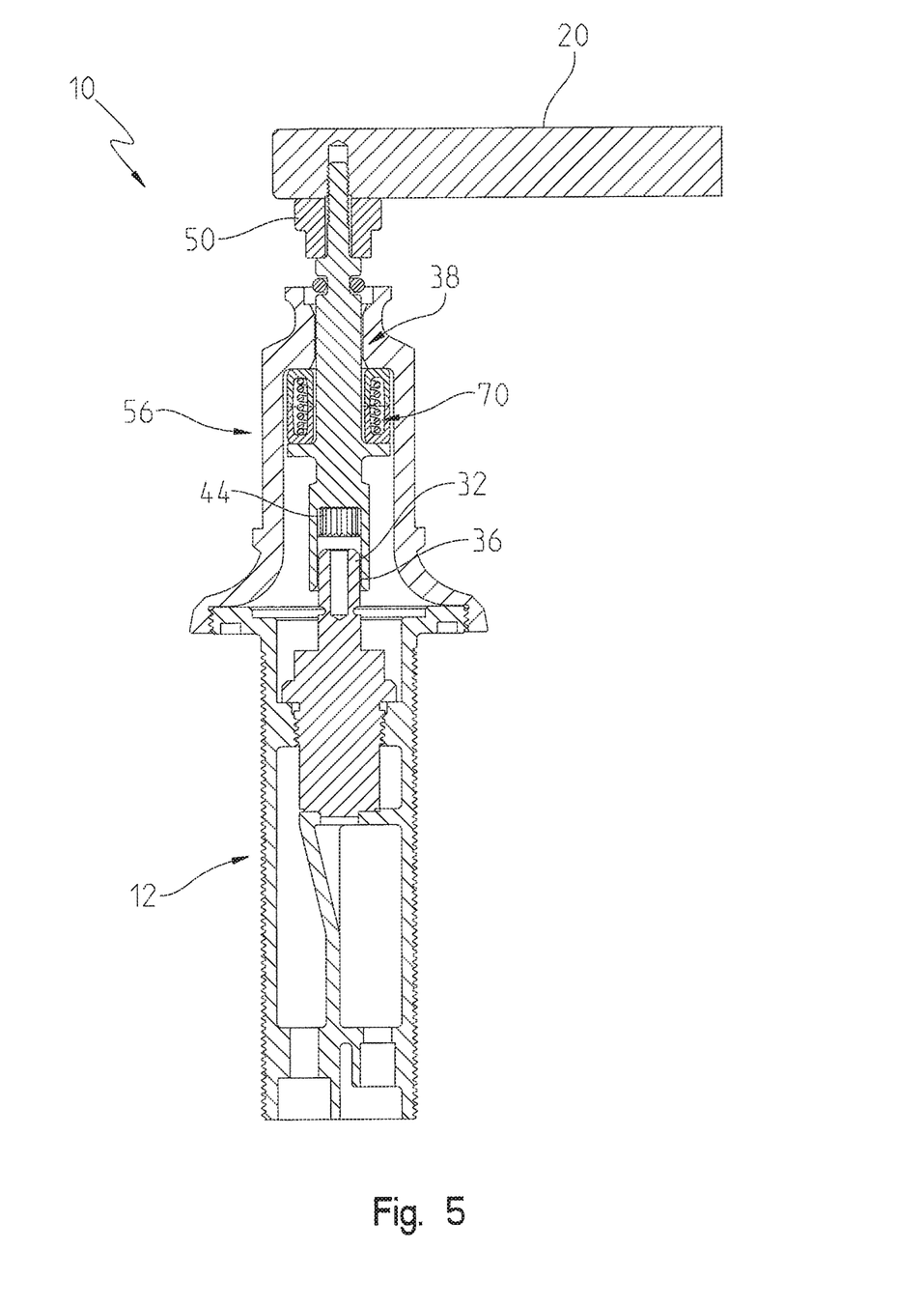
FIG. 5 is a cross-sectional view of the illustrative valve assembly similar to FIG. 2, showing the handle in a raised position.

In a normal mode of operation as shown in FIG. 2, the plurality of second splines 44 of the stem adapter 38 engage the plurality of first splines 36 of the valve stem 32, such that the handle 20 is rotatably coupled with the valve stem 32. In other words, rotation of the handle 20 is transmitted from the stem adapter 38 to the valve stem 32 of the valve cartridge 16. In an adjustment mode of operation as shown in FIG. 5, the handle 20 is raised such that the plurality of second splines 44 of the stem adapter 38 are disengaged from the plurality of first splines 36 of the valve stem 32, such that the handle 20 is rotatably uncoupled from the valve stem 32. A user may then adjust the rotational alignment of the handle 20 relative to the valve stem 32 of the valve cartridge 16 and the hub 56. Upon releasing the handle 20, the spring 70 sill bias the stem adapter 38 toward the valve stem 32, such that the second splines 44 of the stem adapter 38 reengage with the first splines 36 of the valve stem 32.

Figure 6:
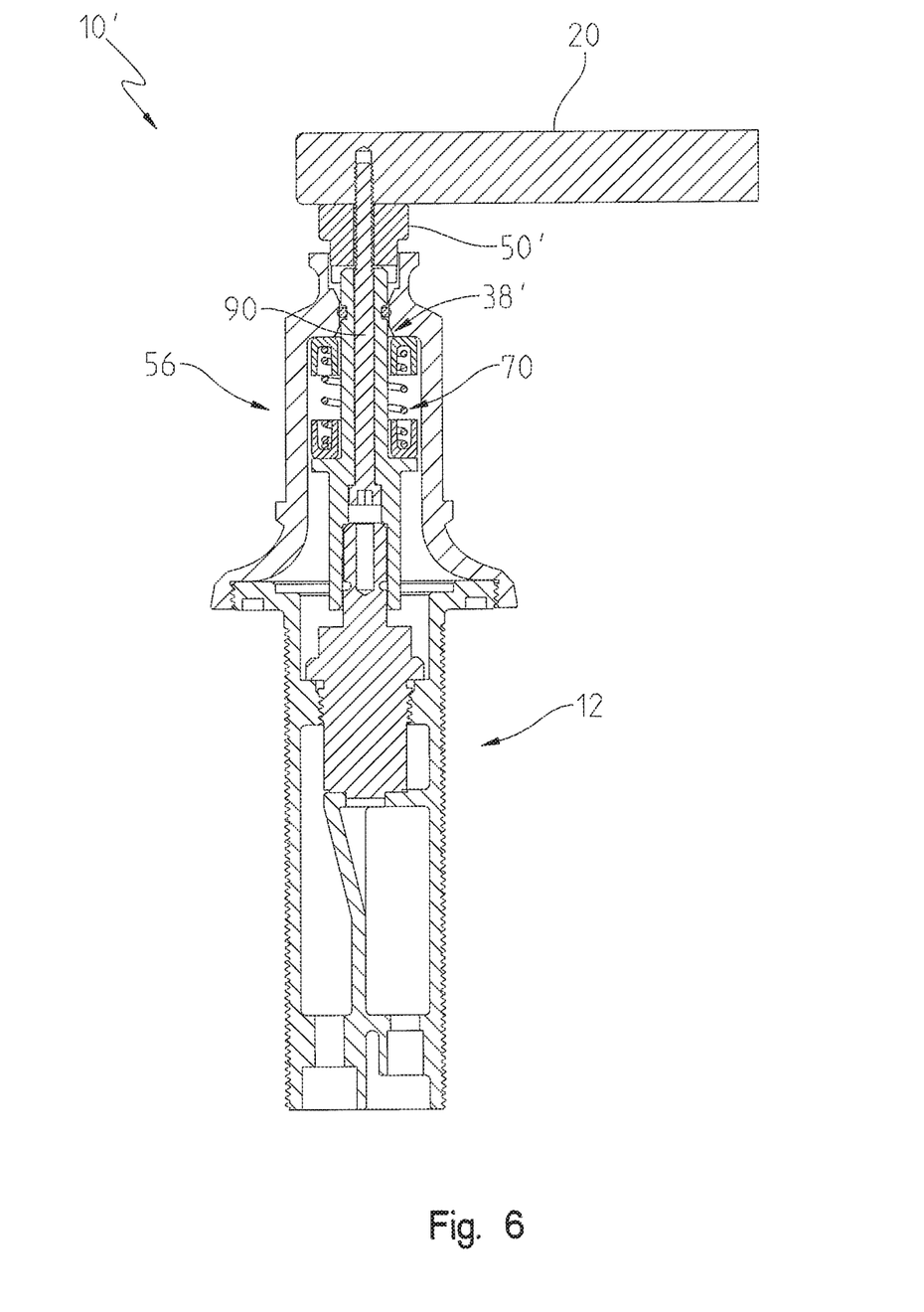
FIG. 6 is a cross-sectional view similar to FIG. 2 of a further illustrative valve assembly.
Figure 7:
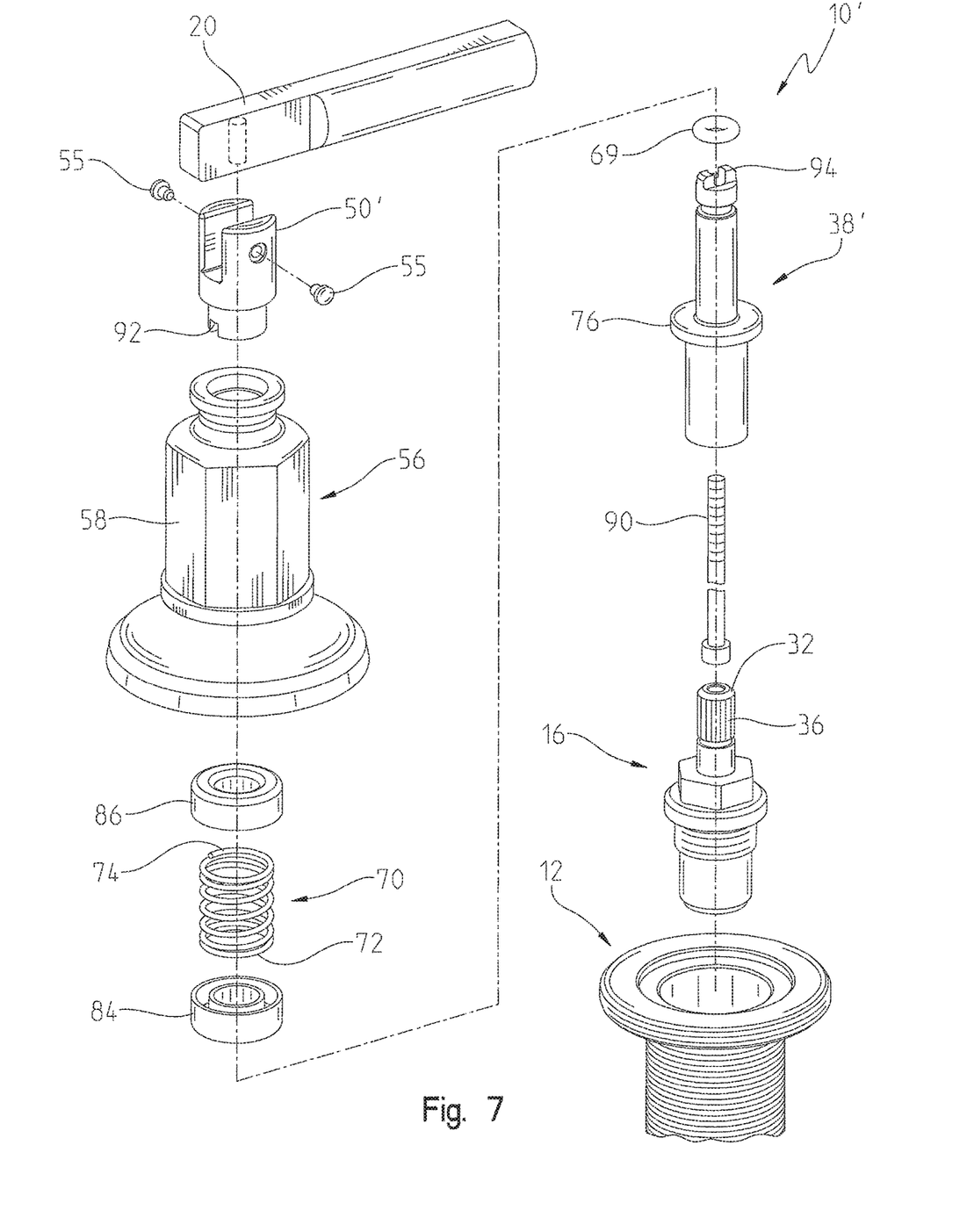
FIG. 7 is an exploded perspective view of the illustrative valve assembly of FIG. 6.

A further illustrative embodiment valve assembly 10' is shown in FIGS. 6 and 7. Valve assembly 10' of FIGS. 6 and 7 includes many similar components as valve assembly 10 of FIGS. 1-5. As such, in the following description similar components are identified with like reference numbers.

The valve assembly 10' illustratively includes a fastener 90, such as a bolt, that couples the stem adapter 38' to the handle 20. A lower end of the spacer 50' includes a groove 92 receiving a protrusion 94 on the upper end of the stem adapter 38', thereby rotationally securing the spacer 50' to the stem adapter 38'.

Although the invention has been described in detail with reference to certain preferred embodiments, variations and modifications exist within the spirit and scope of the invention as described and defined in the following claims.

The invention claimed is:

1. A valve assembly for a faucet, the valve assembly comprising:
    a valve body;
    a valve cartridge received within the valve body and including a valve stem defining a longitudinal axis and having a plurality of first splines;
    a hub including an internal chamber extending between a lower end and an upper end, the lower end coupled to the valve body;
    a stem adapter extending along the longitudinal axis between a lower end and an upper end, the lower end having a plurality of second splines;
    a handle operably coupled to the upper end of the stem adapter; and
    a spring extending between the hub and the stem adapter, the spring biasing the plurality of second splines into engagement with the plurality of first splines.

2. The valve assembly of claim 1, wherein the valve body includes an upper flange and a downwardly extending mounting shank, and the lower end of the hub is threadably coupled with the upper flange of the valve body.

3. The valve assembly of claim 1, wherein the spring extends between an upwardly facing surface on the stem adapter and a downwardly facing surface of the hub.

4. The valve assembly of claim 3, wherein the stem adapter includes a flange defining the upwardly facing surface, and the spring concentrically receives the stem adapter.

5. The valve assembly of claim 4, further comprising a lower retaining cup receiving a lower end of the spring, and an upper retaining cup receiving an upper end of the spring.

6. The valve assembly of claim 1, further comprising a spacer extending between the hub and the handle, the spacer receiving the upper end of the stem adapter.

7. The valve assembly of claim 1, further comprising an o-ring received around the upper end of the stem adapter.

8. The valve assembly of claim 1, wherein when in a normal mode of operation, the plurality of second splines of the stem adapter engage the plurality of first splines of the valve stem such that the handle is rotatably coupled with the valve stem, and in an adjustment mode of operation, the plurality of second splines of the stem adapter are disengaged from the plurality of first splines of the valve stem such that the handle is rotatably uncoupled from the valve stem.

9. A handle assembly for operating a valve cartridge received within a valve body of a faucet, the handle assembly comprising:
    a hub;
    a stem adapter extending between a lower end and an upper end, the lower end including a plurality of internal splines;
    a handle operably coupled to the upper end of the stem adapter;

a spring extending between a downwardly facing surface of the hub and an upwardly facing surface of the stem adapter, the spring biasing the plurality of internal splines into engagement with a plurality of external splines of the valve cartridge;

a lower retaining cup receiving a lower end of the spring and supported by the upwardly facing surface of the stem adapter; and an upper retaining cup receiving an upper end of the spring and supported by the downwardly facing surface of the hub.

10. The handle assembly of claim 9, further comprising a valve body including an upper flange and a downwardly extending mounting shank, and a lower end of the hub is threadably coupled with the upper flange of the valve body.

11. The handle assembly of claim 9, wherein the stem adapter includes a flange defining the upwardly facing surface, and the spring concentrically receives the stem adapter.

12. The handle assembly of claim 11, further comprising a lower retaining cup receiving a lower end of the spring, and an upper retaining cup receiving an upper end of the spring.

13. The handle assembly of claim 9, further comprising a spacer extending between the hub and the handle, the spacer receiving the upper end of the stem adapter.

14. The handle assembly of claim 9, further comprising an o-ring received around the upper end of the stem adapter.

15. The handle assembly of claim 9, wherein when in a normal mode of operation, the plurality of second splines of the stem adapter engage the plurality of first splines of the valve stem such that the handle is rotatably coupled with the valve stem, and in an adjustment mode of operation, the plurality of second splines of the stem adapter are disengaged from the plurality of first splines of the valve stem such that the handle is rotatably uncoupled from the valve stem.

16. A valve assembly for a faucet, the valve assembly comprising:

a valve body;

a valve cartridge received within the valve body and including a valve stem defining a longitudinal axis and having a plurality of first splines;

a hub including an internal chamber extending between a lower end and an upper end, the lower end coupled to the valve body;

a stem adapter extending along the longitudinal axis between a lower end and an upper end, the lower end having a plurality of second splines;

a handle operably coupled to the upper end of the stem adapter;

a spring extending between an upwardly facing surface on the stem adapter and a downwardly facing surface of the hub, the spring biasing the plurality of second splines into engagement with the plurality of first splines; and wherein the stem adapter includes a flange defining the upwardly facing surface, and the spring concentrically receives the stem adapter.

17. The valve assembly of claim 16, further comprising a lower retaining cup receiving a lower end of the spring, and an upper retaining cup receiving an upper end of the spring.

18. The valve assembly of claim 16, further comprising a spacer extending between the hub and the handle, the spacer receiving the upper end of the stem adapter.

19. The valve assembly of claim 16, further comprising an o-ring received around the upper end of the stem adapter.

20. The valve assembly of claim 16, wherein when in a normal mode of operation, the plurality of second splines of the stem adapter engage the plurality of first splines of the valve stem such that the handle is rotatably coupled with the valve stem, and in an adjustment mode of operation, the plurality of second splines of the stem adapter are disengaged from the plurality of first splines of the valve stem such that the handle is rotatably uncoupled from the valve stem.

* * * * *